United States Patent
Dawes (10) Patent No.: US 7,133,584 B2
(45) Date of Patent: Nov. 7, 2006

(54) INTEGRATED PHOTONIC BROADBAND LIGHT SOURCE

(75) Inventor: David G. Dawes, Dublin, OH (US)

(73) Assignee: Battelle Memorial Institute, Columbus, OH (US)

( * ) Notice: Subject to any disclaimer, the term of this patent is extended or adjusted under 35 U.S.C. 154(b) by 0 days.

(21) Appl. No.: 11/053,073

(22) Filed: Feb. 7, 2005

(65) Prior Publication Data
US 2005/0185879 A1    Aug. 25, 2005

Related U.S. Application Data

(60) Provisional application No. 60/542,788, filed on Feb. 6, 2004.

(51) Int. Cl.
*G02B 6/12* (2006.01)
(52) U.S. Cl. .......................... 385/14; 385/129
(58) Field of Classification Search ................ 385/14, 385/129
See application file for complete search history.

(56) References Cited

U.S. PATENT DOCUMENTS 5,393,371 A * 2/1995 Chang et al. ................. 216/24

OTHER PUBLICATIONS

Baumann et al.; Ti:Er.LiNbO3 Waveguide Laser Optimized Effciency; IEEE Journal of Quantum Electronics; Sep., 1996; vol. 32; No. 9; pp. 1695-1706.
Baumann et al; Er-Doped Integrated Optical Devices in LiNbO3; IEEE Journal of Selected Topics in Quantum Electronics; Jun., 1996; vol. 2, No. 2; pp. 355-366.
Das et al.; Integrated Optical Distributed Feedback Laser with Ti:Fe:Er:LiNbO3 Waveguide; Applied Physics Letters; Mar. 10, 2003; vol. 82; No. 10; pp. 1515-1517.
Fleuster et al.; Optical and Structural Properties of MeV erbium-implanted LiNbO3; Journal of Applied Physics 75 (1); Jan. 1, 1994; pp. 173-180.
Huang et al.; 980-nm-Pumped Er-Doped LiNbO3 Waveguide Amplifiers: A Comparison with 1484-nm Pumping; IEEE Journal of Selected Topics in Quantum Electronics; A5 (con't) Jun., 1996; vol. 2; No. 2; pp. 367-372.

* cited by examiner

*Primary Examiner*—Jennifer Doan
(74) *Attorney, Agent, or Firm*—Klaus H. Wiesmann (57) ABSTRACT

A broadband light source that is typically a single chip monolithic silicon integrated photonic planar light wave circuit employing an embedded glass channel waveguide system, wherein a part of the waveguide is coiled into a loop having a first and a second input/outputs, and comprises dopants selected from the rare earth elements and transition metals.

20 Claims, 5 Drawing Sheets

INTEGRATED PHOTONIC BROADBAND LIGHT SOURCE

This application claims the benefit of US Provisional Application No. 60/542,788 filed Feb. 6, 2004.

FIELD OF THE INVENTION

This disclosure describes a compact, lightweight, robust and low cost broadband light source that is useful as a subsystem in a fiber optic gyroscope inertial navigation system. The disclosed broadband light source is typically a single chip monolithic silicon integrated photonic planar lightwave circuit employing an embedded glass channel waveguide system. This design enables well established semiconductor industry silicon wafer photolithographic processing techniques to be exploited for low cost, high volume manufacturing.

BACKGROUND OF THE INVENTION

Inertial navigation units are essential location and attitude sensors employed in practically all aerospace vehicle platforms. Fiber optic versions deployed in recent years offer greater sensitivity and reliability than the early mechanical devices. The all-fiber optical gyroscope was first proposed in 1980 as an implementation of a Sagnac phase shift interferometric inertial rotation sensor. The all-fiber guided wave approach yielded a compact, simplified and more stable version than the bulk optical approach of the prior art. In 1981, the use of a low coherence length light source was proposed to mitigate excess phase noise errors resulting from Rayleigh backscattered light generated in the optical gyroscope's long fiber sensing coil.

The first low coherence source considered for fiber optic gyroscopes was a superluminescent diode with a broad emission spectrum. These devices while very compact have limited applicability due to the large temperature coefficient of their average emission wavelength. Erbium-doped superfluorescent fiber sources were later adopted as the broadband light source of choice for the most sensitive fiber optic gyroscopes on account of the higher output power and better than 100× reduction in the temperature coefficient of their average emission wavelength to values below 5 ppm per ° C.

There is a need for a compact, lightweight, robust and/or low cost broadband light source.

BRIEF DESCRIPTION OF THE INVENTION

The current fiber optic models are still too costly and bulky to be deployed on all the platforms that would benefit from their use. As a result, there exists a critical need to reduce cost, size, weight, and power consumption of fiber optic gyros. A step in this direction is to employ an integrated photonic planar lightwave circuit device to replace a number of discrete components employed in the broadband light source sub-system of a typical fiber optic gyro. The broadband light source sub-system is used to drive the three independent fiber sensing coils aligned along the Cartesian axes (X, Y, Z) in a fiber optic gyro.

By replacing many discrete components in previous designs, one can realize several advantages such as:
1) A significant cost reduction through lower component count and consolidated packaging; and
2) A more robust solution through a monolithic construction and reduction of the fiber splice count.

Broadly, the present invention discloses a broadband light source including a monolithic, single-chip silicon integrated photonic planar light wave circuit typically employing an embedded glass channel waveguide system. This design enables well established semiconductor industry silicon wafer photolithographic processing techniques to be exploited for low cost and high volume manufacturing while retaining the high power and stability characteristics of a broadband light source.

One aspect of the invention provides for an integrated broadband light source system consisting of a single monolithic chip, consisting of a glass cladding layer deposited on a silicon substrate; a coiled waveguide embedded in the cladding layer, wherein the waveguide is coiled into a loop having a first and a second input/outputs; a three-way splitter embedded in the cladding layer having one end connected to the first input/output of the coiled waveguide and having first splitter, second splitter, and third splitter input/outputs; and an optical coupler disposed at another portion of the coiled waveguide for coupling light into the coiled waveguide, wherein the optical coupler has one input/output and a second input/output.

The integrated broadband light source according to claim 6, wherein the integrated waveguide has an index contrast compared to the high index glass of between about 6 to about 8%.

An additional aspect of the invention provides for a method of operating an integrated broadband light source system by way of providing a single monolithic chip, having a glass cladding layer deposited on a silicon substrate; a coiled waveguide embedded in the cladding layer, wherein the waveguide is coiled into a loop having a first and a second input/outputs; a three-way splitter embedded in the cladding layer having one end connected to the first input/output of the coiled waveguide and having first splitter, second splitter, and third splitter input/outputs; and an optical coupler embedded in the glass cladding layer and disposed at another portion of the coiled waveguide for coupling light into the coiled waveguide, wherein the optical coupler has one input/output and a second input/output; and connecting the second input/output of the coiled waveguide to a Faraday rotator mirror; connecting the three splitter three way splitter to X, Y, Z axes inputs of respective sensing coils of an optical fiber gyro; connecting a first input/output of the optical coupler to a pumped laser and the second input/output of the optical coupler to a monitor; and pumping light into the first input/output of the optical coupler so as to obtain wavelength division multiplexing.

A yet further aspect of the invention provides for an integrated broadband light source system for a fiber optic gyro having a substrate; a cladding layer of high index of refraction on the substrate; a coiled waveguide integrated into the substrate having an index of refraction higher than the layer, and having first input/output portion and a second input/output waveguide portion, wherein the first integrated input/output portion provides connection to a faraday rotator mirror, and the second integrated input/output waveguide portion provides for an axial output (X, Y, or Z) for the fiber optic gyro with a direct output to one of the axis of the fiber optic gyro; a first integrated optical coupler at a first portion of the input/output waveguide portion of the coiled waveguide, the first optical coupler having a first input/output for connection to monitor PD output and a second input/output for pump laser diode input; a second integrated optical coupler located adjacent and further along the input/output waveguide portion of the coiled waveguide between the first optical coupler and the direct output to one of the axis of fiber optic gyro, the second optical coupler having an output, for connection to one axis (X, Y, or Z) of the fiber optic gyro; and a third integrated optical coupler located adjacent and further along the input/output waveguide portion of the coiled waveguide between the second optical coupler and the direct output to one of the axis, the third optical coupler having an output, for connection to one axis (X, Y, or Z) of the fiber optic gyro.

DETAILED DESCRIPTION OF THE INVENTION AND BEST MODE

The embodiments disclosed herein exploit higher index contrast waveguides to realize a more compact device. High index contrast tightly confines the propagating light allowing tighter waveguide bending radii and reduced spacing between separate channel waveguides without incurring crosstalk performance degradation. A flexible aluminosilicate glass material system allows low propagation loss embedded channel waveguides to be produced with refractive index contrast ratios relative to the cladding ranging from about 0.3 to about 25%, more preferably from about 2 to about 12% and most preferably from about 6 to about 8%.

Increasing the index contrast is not without its challenges. The smaller dimensions of high index contrast single mode waveguides puts greater demands on the photolithography and etch processes. Smaller dimensions also generally lead to increased scattering induced propagation losses. It is necessary to find a working compromise between the desire for compact size, low cost, and performance requirements.

Figure 3A:
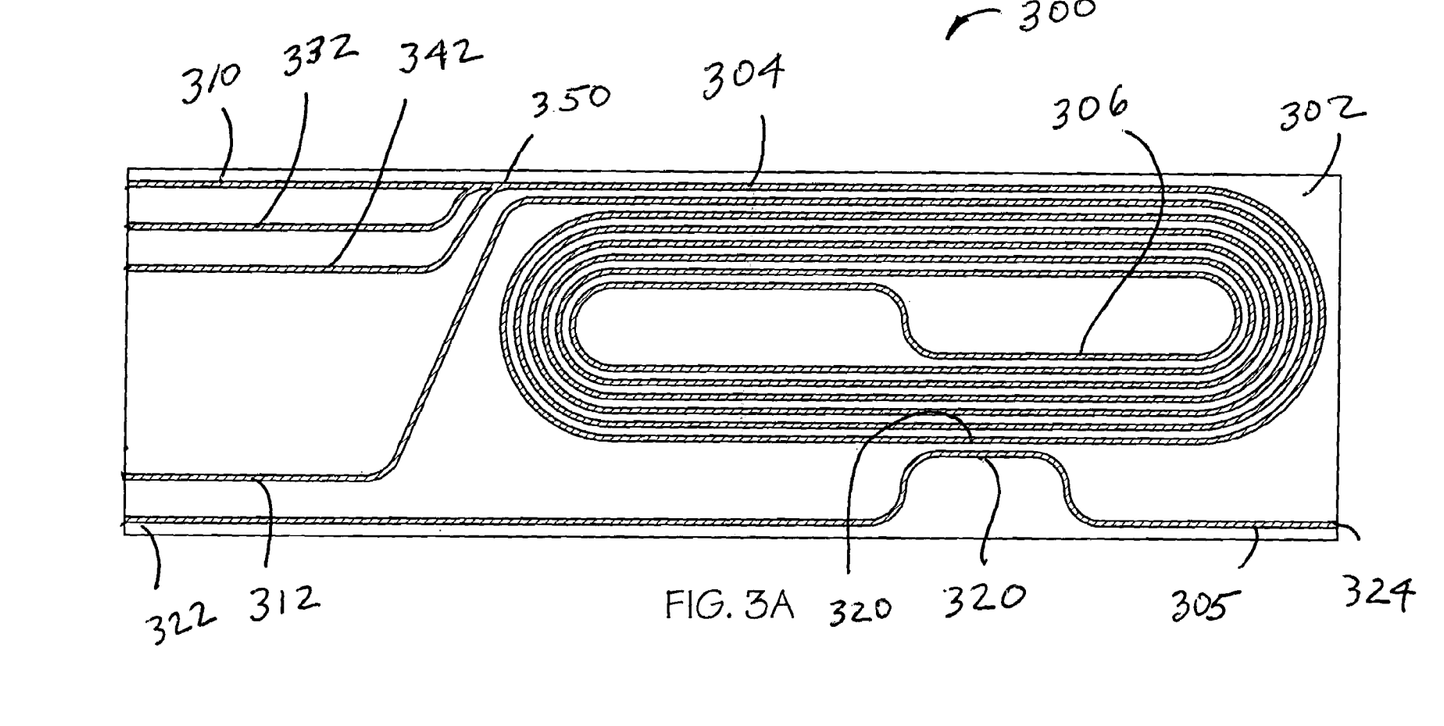
FIG. 3A is a schematic of a preferred embodiment of a typical single-chip broadband light source according to the present invention.
Figure 4:
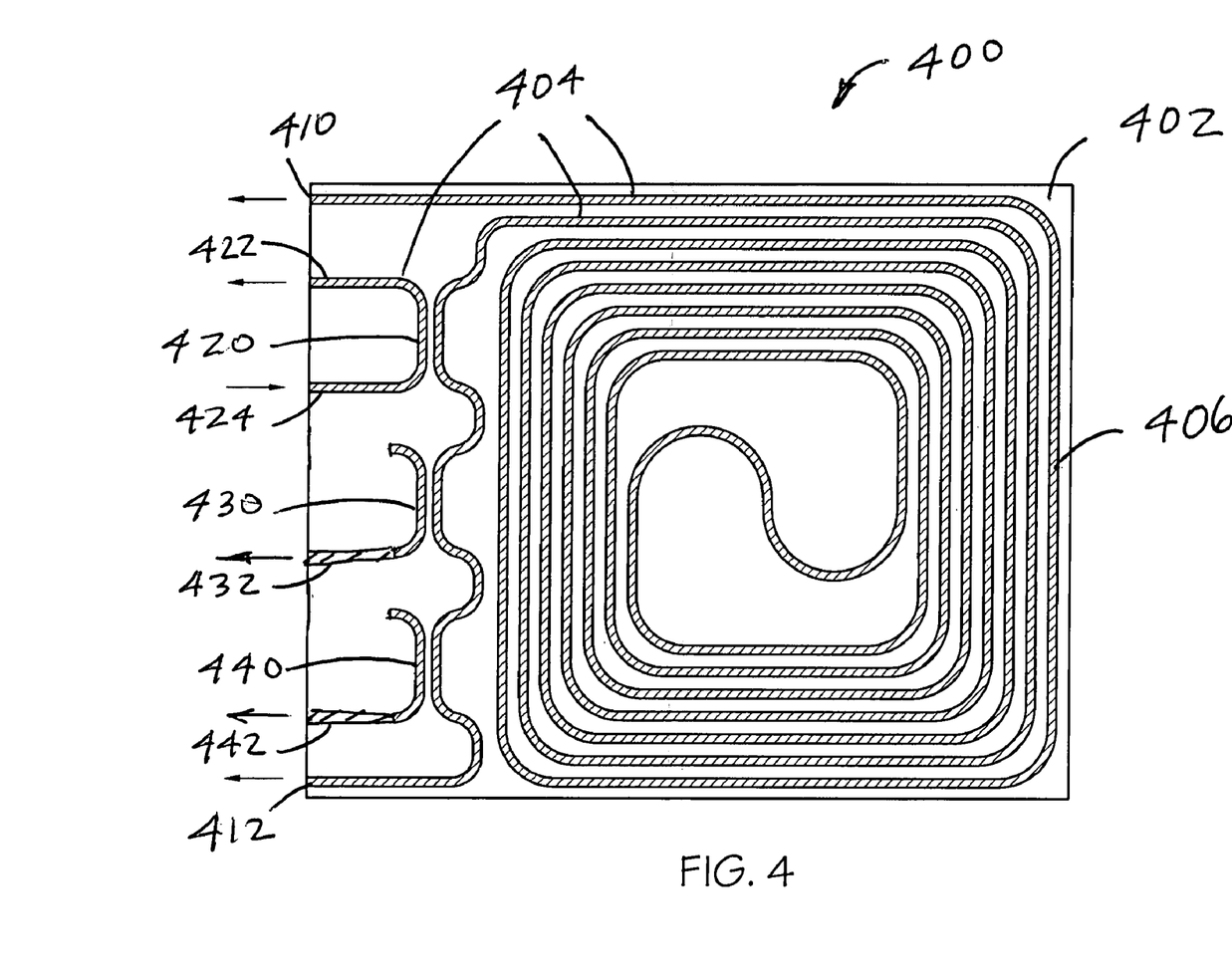
FIG. 4 is a schematic of another embodiment of a proposed single-chip broadband light source according to the present invention.

The preferred broadband light source embodiment, disclosed herein, employs a backward double-pass configuration with a Faraday rotator mirror to enhance the mean output wavelength stability resulting from pump laser induced polarization fluctuations. This approach can yield polarization-related mean wavelength variations below 10 ppm (see Falquier, D. G. et al, "A Polarization-Stable Er-Doped Superfluorescent Fiber Source Including a Faraday Rotator Mirror," Photon. Technol. Lett., vol. 12, pp. 1465–1467, November 2000; and Wagener, J. L. et al, "A High-Stability Fiber Amplifier Source for the Fiber Optic Gyroscope," J. Lightwave Technol., vol. 15, pp. 1689–1694, September 1997). The embodiments illustrated in FIGS. 3A and 4 utilize an external Faraday rotator mirror, alternatively a Faraday rotator mirror microchip assembly surface mounted to the broadband light source silicon chip can be integrated into the package. This will result in the highest performance.

Figure 1:
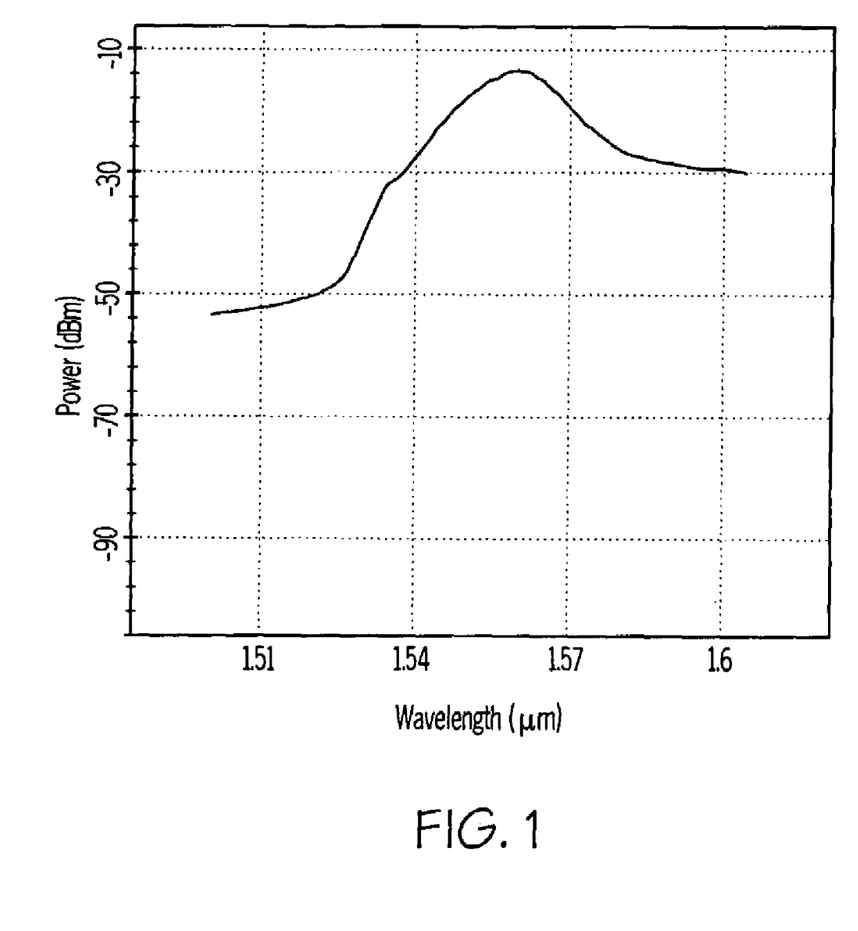
FIG. 1 is a graph of a simulated broadband light source output power spectrum in accordance with the principles of the present invention. The vertical scale (Y) shows Power (dBm) and the horizontal scale shows Wavelength (μm).

The major component of the broadband light source is the long spiral loop erbium-doped glass waveguide 206 for generating the broadband light through amplified spontaneous emission. The design of this waveguide requires careful modeling of the influence of key waveguide parameters: erbium concentration, refractive index contrast, length, width and spacing (see Saini, S. et al, "Index Contrast Scaling for Optical Amplifiers," J. Lightwave Technol., vol. 21, pp. 2368–2376, October 2003). These parameters are optimized for operation with a specific maximum 1475 nm pump power level of typically 50 mW. A simulated broadband light source output power spectrum with a 0.5 nm resolution bandwidth is illustrated in FIG. 1.

Planar Lightwave Circuit Design

Figure 2:
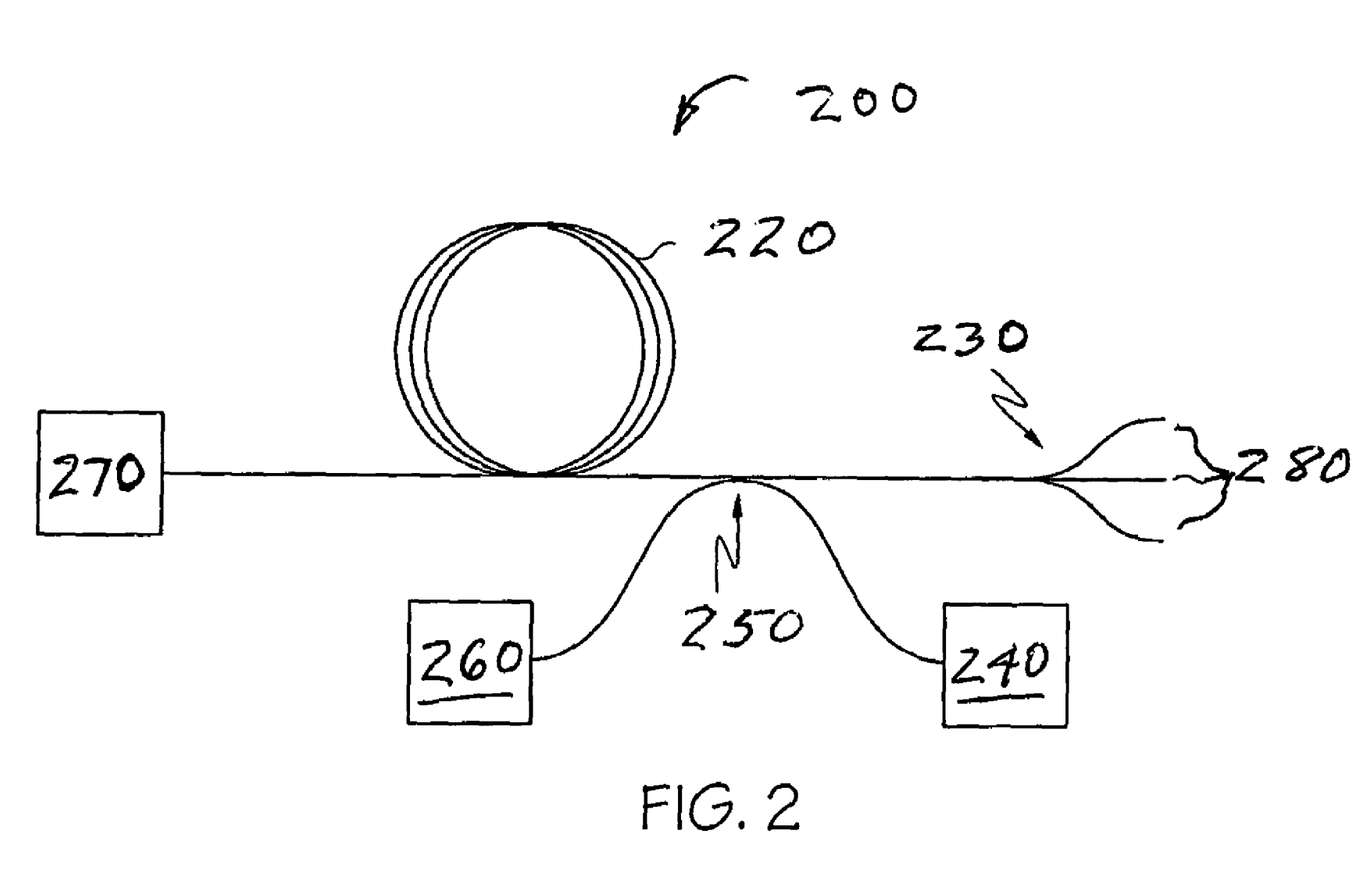
FIG. 2 is a schematic of the functional elements of a typical broadband light source according to the present invention.

In a general embodiment, (see FIG. 2) a broadband light source 200 is constructed from a silicon chip on which is integrated a spiral loop waveguide 220 for generating the broadband light having an input and an output, a wavelength division multiplexer 250 for coupling the pump light from pump laser diode 240 into the input of the spiral loop waveguide, a tap coupler 260 for collecting the small residual pump light not coupled into the spiral loop waveguide 220 used for monitoring the pump laser diode power level, and a 3-way splitter 230 for dividing the broadband light output to feed each of the Cartesian axes 280 of a tri-axial gyroscope. A Faraday rotator mirror 270 is located at the other end of the spiral loop waveguide 220.

In one example of the preferred embodiment, the broadband light source is constructed from a single square-shaped silicon chip (see FIG. 4) on which all input and output waveguides terminate on the same edge of the silicon chip. Additionally, the 3-way splitter is implemented as a cascaded pair of directional couplers in which one-third of the input light to the first stage is coupled out where it forms one of the tri-axial outputs and the remaining two-thirds is output to the second stage where the light is divided equally among the remaining pair of tri-axial outputs.

Figure 3B:
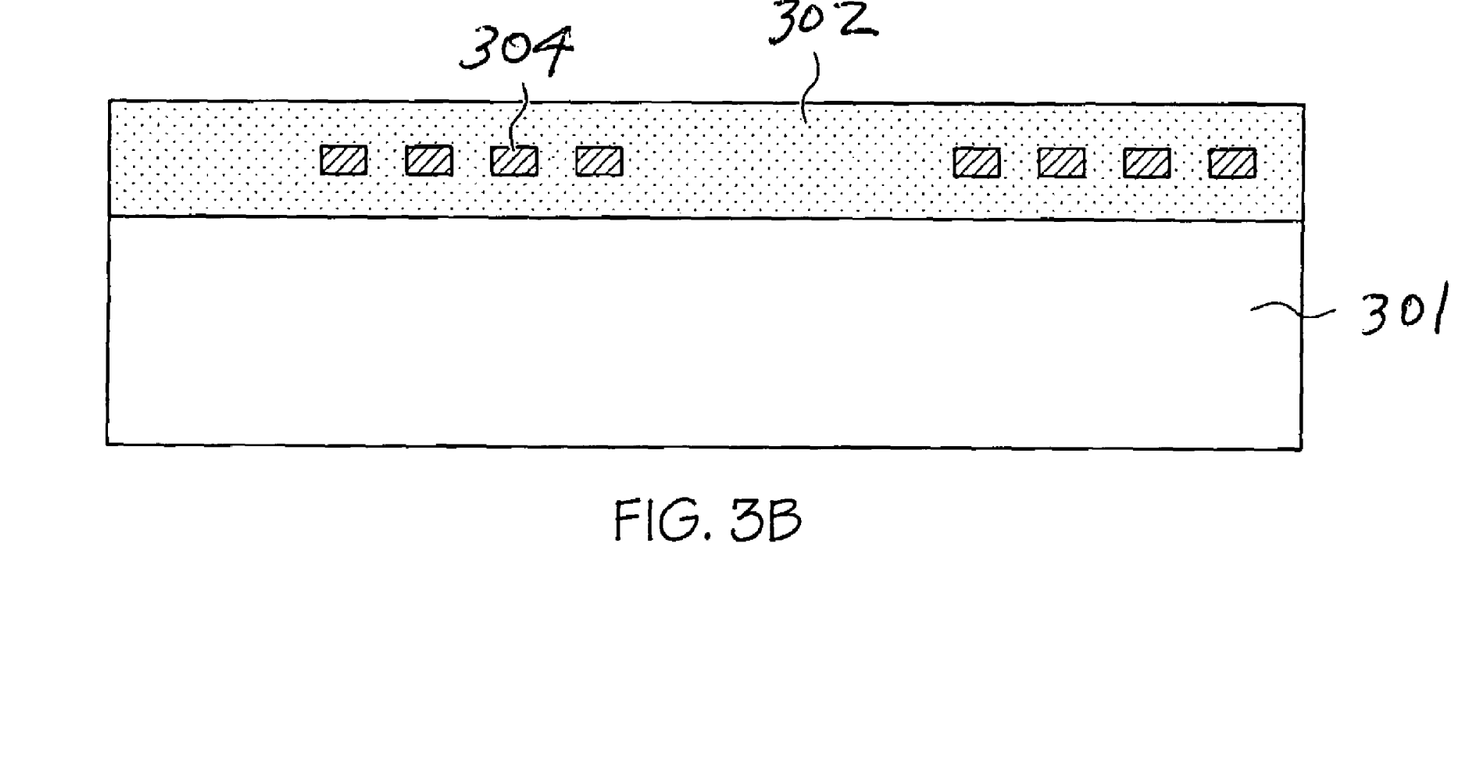
FIG. 3B is a cross sectional representation of a typical single-chip broadband light source according to the present invention.

The waveguides are formed on a silicon substrate through successive glass film deposition and photolithographic etch process steps and a final embedding with a top cladding layer resulting in the structure illustrated in FIG. 3B.

In another example of the preferred embodiment, the broadband light source is constructed from a single rectangular-shaped silicon chip (see FIG. 3A) on which the pump laser diode input is located by itself on one edge of the chip and all the other inputs and outputs are located at the other edge of the chip. Additionally, the 3-way splitter is implemented in a single stage.

The preferred embodiment waveguides are formulated from highly uniform, low loss aluminosilicate glass materials deposited by physical vapor deposition and are used to increase the index contrast to values of about 6% to about 8% resulting in micron-sized single-mode waveguides for operation at a nominal 1560 nm wavelength and enabling a more tightly coiled spiral loop waveguide thereby achieving a balance between desirable chip size reductions while not adversely impacting photolithographic processing yields.

In order to maintain a simple and therefore low-cost design, the tap, pump wavelength division multiplexer, and the 3-way splitter are typically implemented in the same erbium-doped glass as is used for the long spiral loop to generate the broadband light. The additional excess loss from the unpumped erbium ions in these short waveguide elements will be negligible.

Referring to FIGS. 3A and 3B, the figures illustrates one embodiment of the invention for use with a fiber optic gyro featuring a single monolithic chip design 300 consisting of a glass cladding layer 302 deposited on a silicon substrate 301 and in which is embedded a waveguide 304 (typical), waveguide 304 is coiled into a loop 306 and typically has two direct input/outputs 310 and 312. Input/output 312 is typically connected to a Faraday rotator mirror (not shown). Outputs 310, 332 and 342 typically provide connections to the three triax (X, Y, Z) fiber sensing coils of the optical fiber gyro (not shown). Between output 322 and input 324 (waveguide section 305) there is typically disposed an optical coupler for coupling light into loop 306. The figure shows one typical optical coupler 320 located on waveguide section 305 that typically provides an input 324 from a pump laser diode and an output 322 for a monitor photodiode. A three-way splitter 350 provides for outputs 332, 342 and 310 for each of the three axes (e.g. X, Y and Z respectively) of the fiber optic gyro.

Referring again to FIG. 4, the figure illustrates one embodiment of the invention for use with a fiber optic gyro featuring a single monolithic chip design 400 made up of a glass cladding layer 402 (the glass cladding layer 402 may be deposited on a silicone substrate as shown in FIG. 3B) in which is embedded a waveguide 404 (typical), waveguide 404 is coiled into a loop 406 and typically has two direct input/outputs 410 and 412. Input/output 410 is typically connected to a Faraday rotator mirror (not shown). Outputs 412, 432 and 442 typically provide connections to the three triax (X, Y, Z) fiber sensing coils of the optical fiber gyro (not shown). Between points 450 and 455 on a section of loop 406 there are typically a plurality of optical couplers for input/output of light. A first optical coupler 420 typically provides for input 424 for a pump laser diode and an output 422 for a monitor photodiode and couples to coil 406. A second optical coupler 430 provides for output 432 for one of the axes (e.g. X) of the fiber optic gyro and couples to coil 406. A third optical coupler 440 provides for output 442 for one of the axes (e.g. Y) of the fiber optic gyro and couples to coil 406. The remaining output from coupler 412 provides for one of the axes (e.g. Z) of the fiber optic gyro. The second optical coupler 430 typically decouples about ⅓ of the power from coil 406; the third optical coupler 440 typically decouples about one-half of the remaining power from coil 406 so that outputs 412, 432 and 442 each have about ⅓ of the optical output power.

Typically, for the most compact, lightweight, robust and low cost design, the broadband light source will be implemented as a single chip silicon integrated photonic planar light wave circuit. The primary functional building blocks of the broadband light source device design can be effectively realized in an Erbium-doped aluminosilicate glass embedded channel waveguide system exploiting the well established semiconductor industry silicon wafer photolithographic processing techniques for low cost, high volume manufacturing. In addition, by choosing a silicon-based platform, close integration with CMOS electronic control functions will be more readily achievable in future designs.

The airborne operating environment requires devices to operate over the basic temperatures range of −40° C. to +85° C. and an extended temperature range of −55° C. to +105° C. Most commercial off-the-shelf fiber optic devices are designed to meet the basic Telcordia GR-1221-CORE and GR-1209-CORE standards. These standards are designed for qualifying devices for the relatively benign central office environments where the biggest concerns are performance degradations resulting from combined temperature and humidity aging/cycling. Operating standards are much less stringent than those required for airborne operation.

The aluminosilicate glass materials used in the present planar lightwave circuit design should be sufficiently stable under prolonged exposure to temperatures in the extended range of −55° C. to +105° C. Like the typical fiber-based design, the present invention will not need active thermoelectric temperature control. Thermal stability of the present invention is sufficient for the desired application and additional temperature control is unnecessary.

Shock and vibration requirements of airborne environments render discrete component based implementations unreliable. The present approach employs a small, single monolithic chip design with the minimized number of spliced fiber connections to mitigate shock and vibration failure risks. This has the added benefit of significantly reducing cost by eliminating manufacturing labor for producing and testing the many low loss fusion splices required by previous designs.

The glass materials are preferentially amorphous aluminosilicate (or another higher index glass) with trace levels (e.g. $10^{-18}$ to $10^{-20}$ erbium ions/cm$^3$) of active elements. The higher index allows for tighter integration and more compact devices. A physical vapor deposition process, such as that provided by Symmorphix, Inc. (Sunnyvale, Calif.) applies the material in a manner that the resulting optical path is low loss. Methods illustrated by the following U.S. Pat. No. 6,827,826—Planar Optical Devices and Methods for their Manufacture, U.S. Pat. No. 6,506,289—Planar Optical Devices and Methods for their Manufacture; and US applications 2004/0081415—Planar Optical Waveguide Amplifier with Mode Size Converter; 2004/0105644 A1—Optically Coupling into Highly Uniform Waveguides are exemplary of methods useful for making the chips and waveguides of the present invention and are incorporated herein by reference.

The particular dopant selected will determine the spectral characteristics of the output light, given those of the input light—some up-convert, some down-convert. A list of possible dopants useful with the invention includes rare earth elements selected from the group consisting of erbium, neodymium, europium, ytterbium, thulium, holmium, terbium, dysprosium, praseodymium, cerium, and mixtures thereof are expected to have similar and dopant levels to erbium, however the wavelength of generated light will be different. The transition metals such as chromium, titanium, cobalt, nickel, manganese, uranium, and mixtures thereof are expected to be useful with the invention. Those skilled in the art will appreciate that the minimum dopant levels are those at which fluorescence is achieved and the fluorescent power overcomes the total losses so that useful output power is achieved, however the dopant levels should not be so high that pair induced quenching significantly reduces efficiency (e.g. 50% or more).

While the forms of the invention herein disclosed constitute presently preferred embodiments, many others are possible. It is not intended herein to mention all of the possible equivalent forms or ramifications of the invention. It is to be understood that the terms used herein are merely descriptive, rather than limiting, and that various changes may be made without departing from the spirit of the scope of the invention.

I claim:

1. An integrated broadband light source system comprising:
   a single monolithic chip, comprising
   A. a glass cladding layer deposited on a silicon substrate
   B. a coiled waveguide embedded in the cladding layer, wherein the waveguide is coiled into a loop having a first and a second input/outputs, and comprises dopants selected from the rare earth elements and transition metals at dopant levels where fluorescence is achieved and the fluorescent power overcomes total losses;
C. a three-way splitter embedded in the cladding layer having one end connected to the first input/output of the coiled waveguide and having first splitter, second splitter, and third splitter input/outputs; and
D. an optical coupler disposed at another portion of the coiled waveguide for coupling light into the coiled waveguide, wherein the optical coupler has one input/output and a second input/output.

2. The integrated broadband light source according to claim 1, comprising:
wherein the cladding layer comprises a light transmissive high index glass, and the coiled waveguide is doped to provide a higher index of refraction than the surrounding glass, the doped waveguide containing a trace level of active elements selected from the group consisting of erbium, neodymium, europium, ytterbium, thulium, holmium, terbium, dysprosium, praseodymium, cerium, chromium, titanium, cobalt, nickel, manganese, uranium, and mixtures thereof.

3. The integrated broadband light source according to claim 1, wherein the high index glass is amorphous aluminosilicate and the coiled waveguide embedded in the cladding layer has a trace level of active element erbium.

4. The integrated broadband light source according to claim 3, wherein the trace level of the Erbium is between about $10^{-18}$ to about $10^{-20}$ ions/cm³.

5. The integrated broadband light source according to claim 3, wherein the coiled waveguide has an index contrast compared to the high index glass of between about 0.3 to about 25%.

6. The integrated broadband light source according to claim 5, wherein the coiled waveguide has an index contrast compared to the high index glass of between about 2 to about 12%.

7. The integrated broadband light source according to claim 6, wherein the coiled waveguide has an index contrast compared to the high index glass of between about 6 to about 8%.

8. A method of operating an integrated broadband light source system comprising:
providing a single monolithic chip, comprising
A. a glass cladding layer deposited on a silicon substrate
B. a coiled waveguide embedded in the cladding layer, wherein the waveguide is coiled into a loop having a first and a second input/outputs;
C. a three-way splitter embedded in the cladding layer having one end connected to the first input/output of the coiled waveguide and having first splitter, second splitter, and third splitter input/outputs; and
D. an optical coupler embedded in the glass cladding layer and disposed at another portion of the coiled waveguide for coupling light into the coiled waveguide, wherein the optical coupler has one input/output and a second input/output; and
connecting the second input/output of the coiled waveguide to a Faraday rotator mirror;
connecting the three splitter three way splitter to X, Y, Z axes inputs of respective sensing coils of an optical fiber gyro;
connecting a first input/output of the optical coupler to a pumped laser and the second input/output of the optical coupler to a monitor;
and pumping light into the first input/output of the optical coupler so as to obtain wavelength division multiplexing.

9. An integrated broadband light source system for a fiber optic gyro comprising:
a. a substrate;
b. a cladding layer of high index of refraction on the substrate;
b. a coiled waveguide integrated into the substrate having an index of refraction higher than the layer, and having first input/output portion and a second input/output waveguide portion, wherein the first integrated input/output portion provides connection to a faraday rotator mirror, and the second integrated input/output waveguide portion provides for an axial output (X, Y, or Z) for the fiber optic gyro with a direct output to one of the axis of the fiber optic gyro;
e. a first integrated optical coupler at a first portion of the input/output waveguide portion of the coiled waveguide, the first optical coupler having a first input/output for connection to monitor PD output and a second input/output for pump laser diode input;
f. a second integrated optical coupler located adjacent and further along the input/output waveguide portion of the coiled waveguide between the first optical coupler and the direct output to one of the axis of fiber optic gyro, the second optical coupler having an output, for connection to one axis (X, Y, or Z) of the fiber optic gyro; and
g. a third integrated optical coupler located adjacent and further along the input/output waveguide portion of the coiled waveguide between the second optical coupler and the direct output to one of the axis, the third optical coupler having an output, for connection to one axis (X, Y, or Z) of the fiber optic gyro.

10. The integrated broadband light source according to claim 9, comprising:
wherein the cladding layer comprises a light transmissive high index glass, and the coiled waveguide is doped to provide a higher index of refraction than the surrounding glass, the doped waveguide containing a trace level of active elements selected from the group consisting of erbium, neodymium, europium, ytterbium, thulium, holmium, terbium, dysprosium, praseodymium, cerium, chromium, titanium, cobalt, nickel, manganese, uranium, and mixtures thereof.

11. The integrated broadband light source according to claim 9, wherein the high index glass is amorphous aluminosilicate and the integrated waveguide has a trace level of active element erbium.

12. The integrated broadband light source according to claim 11, wherein the trace level of the Erbium is between about $10^{-18}$ to about $10^{-20}$ ions/cm³.

13. The integrated broadband light source according to claim 11, wherein the integrated waveguide has an index contrast compared to the high index glass of between about 0.3 to about 25%.

14. The integrated broadband light source according to claim 13, wherein the integrated waveguide has an index contrast compared to the high index glass of between about 2 to about 12%.

15. The integrated broadband light source according to claim 14, wherein the integrated waveguide has an index contrast compared to the high index glass of between about 6 to about 8%.

16. An integrated broadband light source system comprising:

a single monolithic chip, comprising
A. a glass cladding layer deposited on a silicon substrate
B. a coiled waveguide embedded in the cladding layer, wherein the waveguide is coiled into a loop having a first and a second input/outputs;
C. a three-way splitter embedded in the cladding layer having one end connected to the first input/output of the coiled waveguide and having first splitter, second splitter, and third splitter input/outputs; and
D. an optical coupler disposed at another portion of the coiled waveguide for coupling light into the coiled waveguide, wherein the optical coupler has one input/output and a second input/output; and wherein the cladding layer comprises a light transmissive high index glass, and the coiled waveguide is doped to provide a higher index of refraction than the surrounding glass, the doped waveguide containing a trace level of active elements selected from the group consisting of erbium, neodymium, europium, ytterbium, thulium, holmium, terbium, dysprosium, praseodymium, cerium, chromium, titanium, cobalt, nickel, manganese, uranium, and mixtures thereof.

17. The integrated broadband light source according to claim 16, wherein the high index glass is amorphous aluminosilicate and the coiled waveguide embedded in the cladding layer has a trace level of active element erbium.

18. The integrated broadband light source according to claim 17, wherein the trace level of the Erbium is between about $10^{-18}$ to about $10^{-20}$ ions/cm$^3$.

19. The integrated broadband light source according to claim 16, wherein the coiled waveguide has an index contrast compared to the high index glass of between about 0.3 to about 25%.

20. The integrated broadband light source according to claim 16, wherein the coiled waveguide has an index contrast compared to the high index glass of between about 2 to about 12%.

* * * * *